May 3, 1966 K. EICKMANN 3,249,060
CENTRIFUGAL VALVE ARRANGEMENT FOR ROTARY MACHINES
Filed Aug. 14, 1962 4 Sheets-Sheet 1

INVENTOR.
KARL EICKMANN
BY Michael S. Striker
Attorney

May 3, 1966  K. EICKMANN  3,249,060
CENTRIFUGAL VALVE ARRANGEMENT FOR ROTARY MACHINES
Filed Aug. 14, 1962  4 Sheets-Sheet 2

INVENTOR.
KARL EICKMANN
BY Michael S. Striker
Attorney

May 3, 1966  K. EICKMANN  3,249,060
CENTRIFUGAL VALVE ARRANGEMENT FOR ROTARY MACHINES
Filed Aug. 14, 1962  4 Sheets-Sheet 3

INVENTOR.
KARL EICKMANN
BY

May 3, 1966  K. EICKMANN  3,249,060
CENTRIFUGAL VALVE ARRANGEMENT FOR ROTARY MACHINES
Filed Aug. 14, 1962  4 Sheets-Sheet 4

INVENTOR.
KARL EICKMANN
BY
Michael S. Striker
Attorney

United States Patent Office 3,249,060
Patented May 3, 1966

3,249,060
CENTRIFUGAL VALVE ARRANGEMENT FOR ROTARY MACHINES
Karl Eickmann, 2420 Isshiki, Hayama-machi, Kanagawa-ken, Japan
Filed Aug. 14, 1962, Ser. No. 216,796
Claims priority, application Australia, June 19, 1962, 18,425/62
19 Claims. (Cl. 103—161)

The present invention relates to a centrifugal valve arrangement for rotary hydraulic apparatus, and more particularly to a hydraulic apparatus the valves of which are mounted on a rotor, so that the valves close during rotation of the rotor when the pressure of the fluid entering the hydraulic apparatus, or being discharged from the same, is insufficient to hold the valves in the open position.

It is one object of the present invention to provide a valve arrangement for a hydraulic apparatus in which valves are operated by the centrifugal force to directly close when the expansion or contraction of a working chamber terminates.

Another object of the invention is to eliminate springs which are commonly used for closing valves, and to operate the valves only by the fluid pressure and by the centrifugal force developing during rotation of the valves.

Another object of the invention is to provide valves controlled by the centrifugal force, and being of such a construction as to offer only small resistance to the flow of a fluid.

Another object of the invention is to provide a suction valve which is opened by the flow of fluid into an expanding working chamber, and is closed by the action of the centrifugal force when the expansion of the working chamber terminates, and before the flow of fluid in the opposite direction during contraction of the working chamber has started.

Another object of the present invention is to provide a discharge valve which is opened by the discharged fluid during the contraction of the working chamber, and is closed by the centrifugal force when the contraction of the working chamber terminates, and before the expansion of the working chamber has started.

An important object of the present invention is the arrangement of suction valves and discharge valves in a position in which the valve seats thereof form the inlet and outlet openings of the working chamber of a hydraulic apparatus whereby any dead space and internal friction losses of the fluid are avoided.

Another object of the present invention is to provide a valve whose valve member is operated by a pivoted mass which is subjected to the centrifugal force.

Another object of the invention is to arrange the valve of the present invention in inlet passages and outlet passages which are arranged in such a manner that the fluid flows into the working chambers of the apparatus in axial direction, radially outward direction, or at an angle to these directions, and flows out of the working chambers of the apparatus in axial direction, radially inward direction, and flows out of the working chambers of the apparatus in axial direction, radially inward direction, or at an angle to these last-mentioned directions so that losses due to a change of direction of the flow are reduced to a minimum.

Another object of the invention is to improve the efficiency and output of rotary motors and pumps.

Another object of the invention is to provide a rotary machine all parts of which have a practically unlimited useful life.

With these objects in view, one embodiment of the present invention relates to a machine which comprises a rotor, and means forming in the rotor at least one working chamber expanding and contracting during rotation of the rotor and communicating with an inlet passage and outlet passage. An inlet valve is located in the inlet passage and includes a movable inlet valve member. An outlet valve is located in the outlet passage and includes an outlet valve member. The valve members are constructed and arranged in such a manner that fluid flowing through the passage means holds the valve members in open position. Each of the valve means has masses responsive to the centrifugal force during rotation of the rotor and being movably disposed to urge the respective valve member to a closing position. The arrangement is such that during expansion and contraction of the working chamber, the flow of fluid opens the respective valve, but when expansion or contraction terminates, and the flow of fluid stops, the centrifugal force is sufficient to immediately and directly close the valves so that the valves close before the pressure is reversed in the working chamber.

A preferred embodiment of a valve according to the present invention has a control member turnable under the action of the centrifugal force, and having a bifurcated arm embracing the valve member and abutting the same without obstructing a passage passing through the valve member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
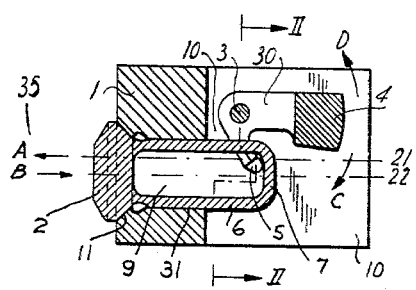
FIG. 1 is a longitudinal sectional view illustrating one embodiment of an inlet valve means in accordance with the present invention.
Figure 2:
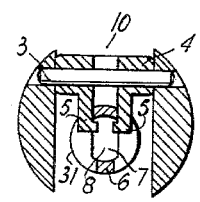
FIG. 2 is a cross-sectional view taken on line II—II in FIG. 1.
Figure 9:
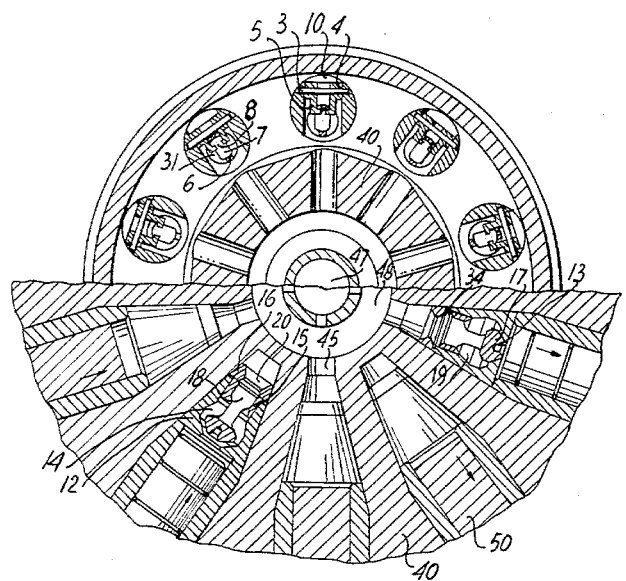
FIG. 9 is a fragmentary sectional view taken on line IX—IX in FIG. 7.
Figure 7:
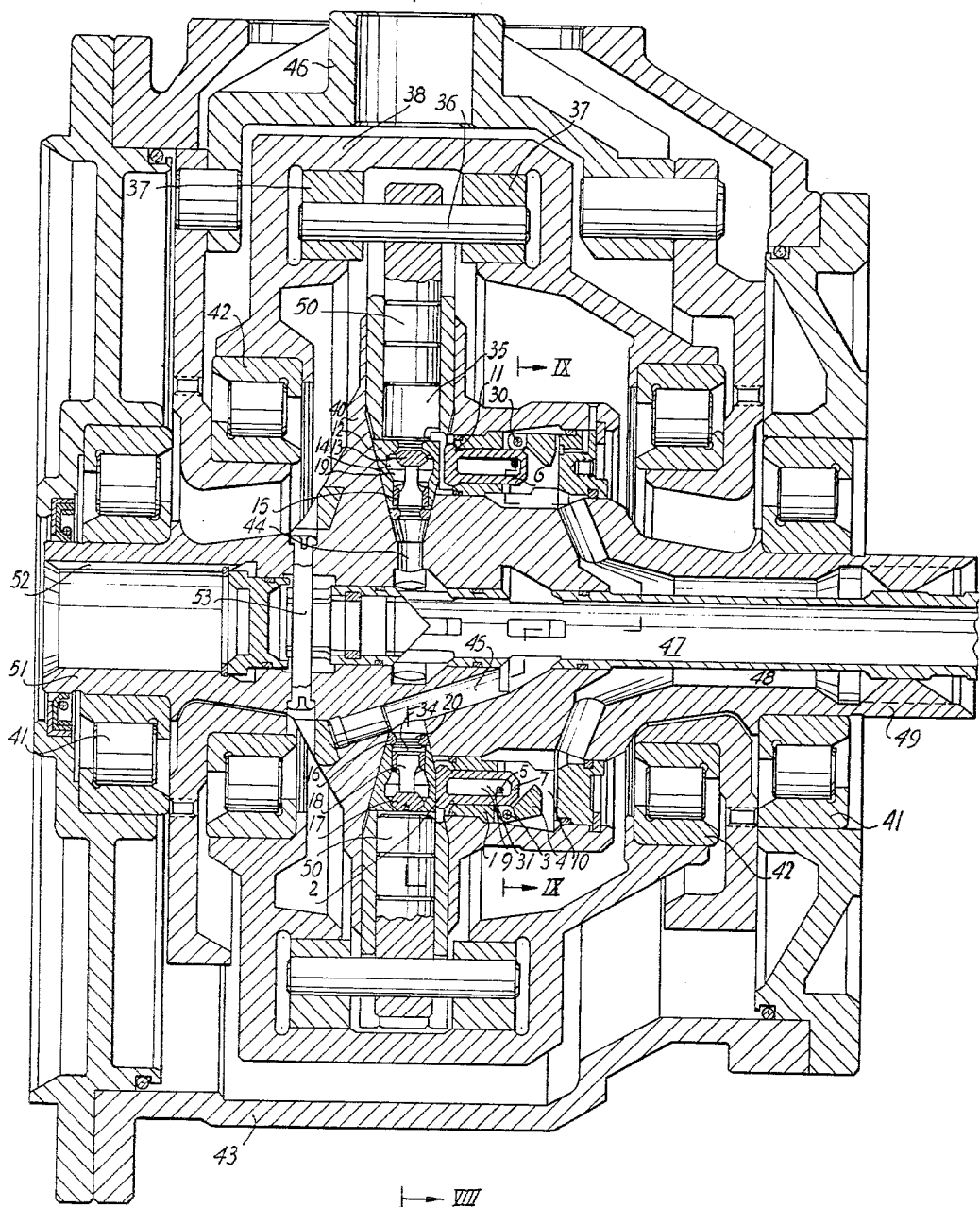
FIG. 7 is an axial sectional view illustrating a hydraulic apparatus provided with valve means in accordance with the present invention.
Figure 8:
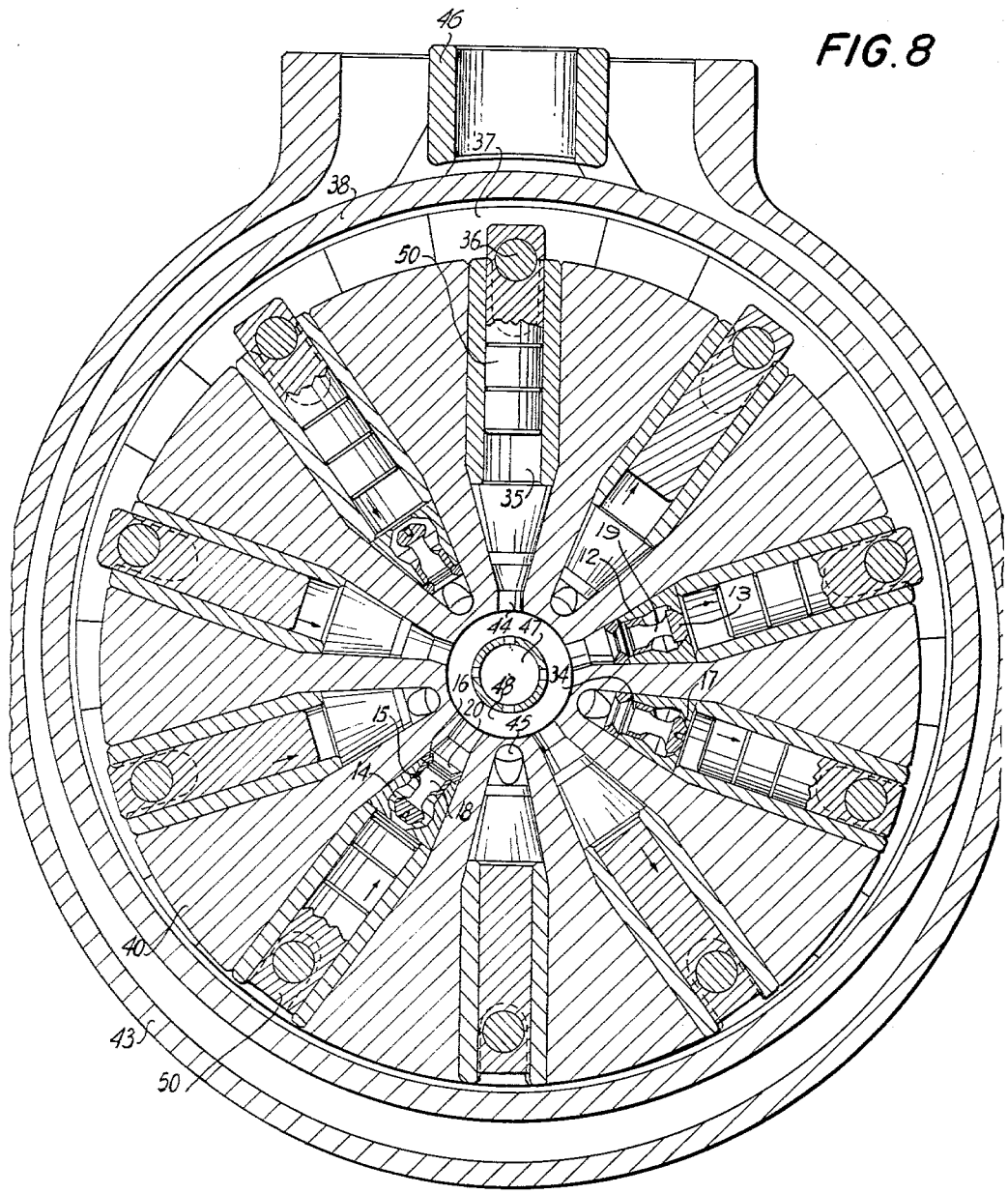
FIG. 8 is a cross-sectional view taken on line VIII—VIII in FIG. 7.

Referring now to the drawings, and more particularly to FIGS. 1 and 2 which illustrate an inlet valve means which is advantageously used in the hydraulic apparatus shown in FIGS. 7, 8 and 9, a valve case 1 has a solid front portion formed with a valve seat 11, and with a guideway or guide bore 31, the latter extending into a recess 10 in the rear portion of the valve case 1. A valve member has a stem 6 mounted for straight movement in the guideway 31, and a head 2 cooperating with the seat 11. The valve seat, and the corresponding surface of the head 2, are shown to be frusto-conical, but may also be constructed to be spherical or planar. The end of stem 6 is closed by a bridge-like member 7, and stem 6 is hollow and has a passage 9 communicating with lateral openings with the recess 10. Stem 6 has flat lateral faces in which the lateral openings are provided.

A pivot pin 3 is mounted in a bore of valve case 1 and extends across recess 10. A control lever member 30 is mounted for turning movement on pin 3, and has a U-shaped arm terminating in a yoke portion 4 constituting a comparatively great mass, and another bifurcated arm terminating in transverse fingers which project through the lateral openings in valve stem 10 into the interior of the valve stem.

The inlet valve means shown in FIGS. 1 and 2 is adapted to be mounted in the rotor of a hydraulic apparatus in a position in which the axis 22 of the valve member 2, 6, and the axis 21 of the valve case 1 extend parallel to the axis of the rotor. Consequently, during rotation of the rotor, a centrifugal force will act in the direction of the arrow D on mass 4, and urge control lever member 30 to turn in counterclockwise direction as viewed in FIG. 1 so that fingers 5 press against bridge member 7 and urge the valve head 2 against valve seat 11 in the direction of the arrow B whereby the valve is closed.

When the valve is located in the inlet passage of a hydraulic apparatus, the suction developed during expansion of a working chamber causes flow of fluid through recess 10 into valve passage 31 so that a force is applied against valve head 2 causing the valve member to move in the direction of the arrow A away from the valve seat 11. The force of the flowing fluid is greater than the force exerted by member 30 under the action of the centrifugal force so that member 30 is turned in the direction of the arrow C.

However, when the expansion of the working chamber terminates, no fluid urges the valve member in the direction of the arrow A, and the centrifugal force is sufficient to rapidly close the valve by moving valve member 2, 6 in the direction of the arrow B.

If the centrifugal force is greater than the forces exerted by the flowing fluid, the valve closes, and if the forces exerted by the flowing fluid are greater, the valve opens.

The valve illustrated in FIGS. 1 and 2 is easily assembled, since valve stem 6 has a narrow portion located between the ends of fingers 5 and permitting a sliding of the valve in the guideway into the illustrated position. Pin 3 is thereafter inserted into its bore in valve case 1. Since the valve case 1 is cylindrical, it can be easily mounted in a corresponding cylindrical bore of the rotor of the hydraulic apparatus. However, the valve case 1 may be omitted, and the control member 30, and valve member 2, 6 directly mounted in a correspondingly shaped portion of the rotor body.

Figure 3:
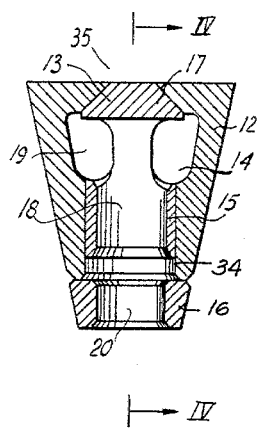
FIG. 3 is a longitudinal sectional view of one embodiment of a discharge valve means in accordance with the present invention.
Figure 4:
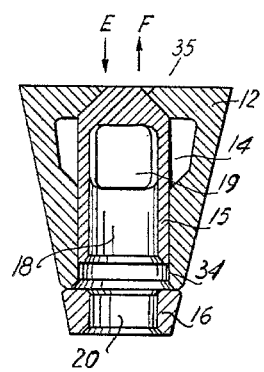
FIG. 4 is a longitudinal sectional view taken on line IV—IV in FIG. 3.

FIGS. 3 and 4 illustrate a discharge valve in accordance with the present invention. A valve case 12 has an axial bore or guideway 34 which is aligned with an inner valve seat 17 provided in case 12. Seat 17 is shown to be a frusto-conical shape, but may be planar or of spherical configuration. A portion of bore 34 forms an enlarged cavity 14 between valve seat 17 and guideway 34. A valve member 15 has a stem guided in guideway 34, and a valve head 13 cooperating with valve seat 17. An inner passage 18 extends through the hollow stem 15, and opens through lateral openings 19 into cavity 14. The other open end of the passage 18 communicates with an opening 20 in an end member 16 which has an inner annular edge projecting into the guideway 34. Valve member 15 can move between the illustrated position in which head 13 abuts seat 17 and closes the valve, and an open position in which the end of valve stem 15 abuts end member 16.

A discharge valve as illustrated in FIGS. 3 and 4 is mounted in the rotor of a hydraulic apparatus in a position in which its axis extends in radial direction of the rotor. Consequently, the centrifugal force will act on valve member 13, 15 in the direction of the arrow F in FIG. 4 whereby the valve is closed. However, during contraction of the working chamber adjacent valve seat 17, fluid is pressed against the valve head, and moves the valve member in the direction of the arrow E so that the valve opens which is due to the fact that the hydraulic pressure exerted by the contracting chamber is greater than the centrifugal force acting on the valve member. However, when contraction of the working chamber 35 terminates, the fluid does not exert any pressure on valve head 13, and consequently the action of the centrifugal force is sufficient to rapidly close the valve before any fluid can flow in opposite direction through the valve during a following expansion of the work chamber.

If the fluid forces are stronger than the centrifugal force, fluid flows from working chamber 35 of the hydraulic apparatus, the outlet formed by the valve seat 17, through the openings 19 and passages 18 and 20.

The valve illustrated in FIGS. 3 and 4 has very small losses due to fluid friction, and prevents any leakage. This simple construction assures a long life of the valve.

While a separate case 12 is illustrated in FIGS. 3 and 4, it will be understood that the case may be an integral part of the rotor of a hydraulic apparatus, or otherwise case 12 may be inserted into a corresponding conical bore of the rotor, while end member 16 forms an integral part of the rotor.

Figure 5:
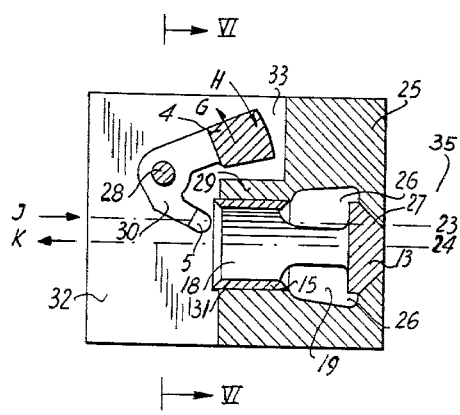
FIG. 5 is a longitudinal sectional view of another embodiment of a discharge valve means according to the present invention.
Figure 6:
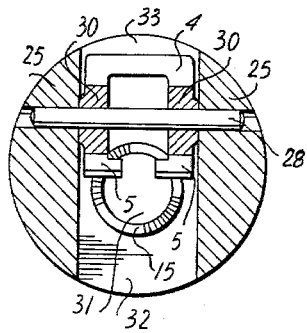
FIG. 6 is a cross-sectional view taken on line VI—VI in FIG. 5.

The discharge valve shown in FIGS. 5 and 6 is similar to the inlet valve described with reference to FIGS. 1 and 2, and corresponding parts are indicated by like reference numerals. While discharge valve of the embodiment of FIGS. 3 and 4 is mounted in a position in which its main axis extends in radial direction of the rotor, the embodiment of FIGS. 5 and 6 is adapted to be mounted in the rotor in a position in which the main axis of the valve extends parallel to the axis of rotation of the rotor.

The valve case 25 is formed with a guideway 31 in which the stem 15 of a valve member is guided. The head 13 cooperates with the valve seat 27, and a cavity 26 is provided in valve case 25 between valve seat 27 and guideway 31. Ports 19 connect the passage 18 with the cavity 26. Valve case 25 has a recess 32 bounded by lateral parts in which a pivot pin 28 is mounted. A control member 30 is mounted for turning movement on pin 28 and has a U-shaped arm whose yoke 4 constitutes a comparatively heavy mass, and a bifurcated arm terminating in transverse fingers 5 which abut the annular end face of valve stem 15 when the centrifugal force acts on mass 4 to turn control member 30 in the direction of the arrow G. This force urges valve head 13 against valve seat 27 to close the valve by movement of valve member 15, 13 in the direction of arrow J. An expanding and contracting working chamber is located on the right side of the valve as viewed in FIG. 5, and when the working chamber contracts, a fluid pressure acts on the valve head 13 to urge valve member 13, 15 in the direction of the arrow K against the action of the centrifugal force so that control member 30 turns in the direction of the arrow H. However, when the contraction of the working chamber is terminated, the centrifugal force is sufficient to turn control member 30 in the direction of the arrow G, and to force valve member 15, 13 to a position closing the valve, before expansion of the working chamber has started which may cause a return of the discharge fluid from the outlet passage into the working chamber. Due to the rapid closing under the action of the centrifugal force, any fluid losses otherwise occurring in this manner are avoided.

The movement of the valve member under the action of the fluid and in the direction of the arrow K is limited by engagement of yoke portion 4 with a projecting part 29 of valve case 25.

It will be understood that in the above described embodiments of the invention, the centrifugal force will be counterbalanced by the action of the fluid pressure, and that the opening and closing of the valve will immediately take place when one of the forces is greater than the other.

As shown in FIGS. 5 and 6, the axis 23 of valve case 25 is parallel and spaced from the axis 24 of the valve member. It is, however, also possible to make the two elements coaxial. As in the other embodiments of the invention, the valve case 25 may be omitted, and a correspondingly shaped portion of the rotor body will mount the valve member and control member 30.

It will be noted that the valves described with reference to FIGS. 1 to 6 are of a very simple construction, and comprise only very few parts only one or two of which are movable. The flow passages are almost straight, and cause no substantial frictional losses in the flowing liquid. Due to the straight movement of the valve head towards and away from the valve seat, a fluid tight seal of the valve is assured.

It will be understood that valves in accordance with the present invention may be used in any apparatus in which a fluid passes through a rotor whose rotation provides the centrifugal force for the operation of the valves in accordance with the present invention. The valves may be used in rotary hydraulic apparatus of the axial piston type, radial piston type, in rotary vane apparatus, in rotary gear pumps or gear motors, in rotary combustion engines of different types, in compressors, pumps or hydraulic motors, or in machines combining a rotary combustion engine with a fluid pump.

A hydraulic apparatus in accordance with the present invention embodying valve means in accordance with the present invention, is illustrated in FIGS. 7, 8 and 9 by way of example.

A rotor 40 is turnably supported in bearings 41 and rotates, for example, in the direction of the arrow L shown in FIG. 8. Rotor 40 has a hollow drive shaft 51 which may be driven by the output shaft of the prime mover, not shown, projecting into the hollow drive shaft 51 and being coupled to the same by key means located in the key groove 52.

Rotor 40 is formed with a plurality of cylinder cavities in which pistons 50 are mounted for sliding movement in radial direction. Piston pins 36 are inserted into bores of pistons 50 and extend perpendicular to the axis of the respective piston 50 and cylinder. The ends of piston pins 36 extend into bores in piston supports 37 which are guided on guide faces of a rotary guide case 38.

Guide case 38 is supported for turning movement in bearings 42 which are eccentrically arranged with respect to the axis of rotor 4 by means of members 39 whose position may be adjusted by a control member 46.

Guide case 38 is located within a housing 43.

A plurality of radial discharge passages 44, and a plurality of discharge passages 45 which are inclined to the axis of the rotor are connected to working chambers 35, outlet valve means as described with reference to FIGS. 3 and 4 being located in the outlet passage means between the outlet passage portions 44, 45 and the working chambers 35. The outlet passage means communicate with an outlet tube 47 which is coaxial with the axis of rotation of the rotor.

An inlet tube 48 surrounds the outlet tube 47 and forms with the same an inlet duct of annular cross section. Compressor vanes 49 are secured to inlet tube 48, and draw fluid into the inlet duct during rotation of the rotor. While the inlet tube is shown to be an integral part of the rotor, the outlet tube 47 is preferably inserted into a corresponding cavity of the rotor, and secured in the same by transverse pin 53. Inlet passage means connect the inlet duct with the working chambers 35, and include a portion inclined to the axis of the rotor, and another portion parallel to the axis of rotation of the rotor in which latter portion, inlet valve means as described with reference to FIGS. 1 and 2 are located. It will be noted that the valve seats of the inlet and outlet valves form inlet and outlet openings in the working chambers, and that the stem portions 6 and 15 are guided in the respective valve cases outside of the working chamber, so that the dead space in the working chambers is a minimum, and losses due to inner friction of the fluid are avoided. A pressure pump, not shown, may be used for pumping fluid into the inlet tube 48 to increase the pressure of the fluid acting on the valve members of the inlet valves.

When rotor 40 and guide case 38 are rotated by a prime mover acting on drive shaft 52, while the axis of guide case 38 is maintained in an eccentric position with respect to the rotor axis, fluid flows into rotor 40 through the inlet tube 48 since some of the pistons 50 are retracted and cause expansion of the respective working chambers 35.

The fluid enters the recesses 10 of the cases of the inlet valves, flows partly around the valve stems 6 and enters into passage 9.

At the same time, other pistons 50 advance so that the working chambers 35 on the discharge side of the hydraulic apparatus contract and discharge fluid through the outlet valves which open due to the pressure on the valve heads 13.

While pistons 50 move outwardly on the suction side of the apparatus, pressure below one atmosphere develops in the respective working chambers. At the same time centrifugal forces develop in the fluid itself within the rotor, urging the fluid to move outwardly in the outwardly expanding working chambers 35. If the fluid is pumped into the inlet tube 48, the negative fluid pressure is further increased. The combined fluid pressure in inlet valve passage 9 acts on the valve head 2 and opens the inlet valve so that fluid flows around the head 2 through the valve seat 11 into the respective expanding working chamber 35.

When the respective piston 50 reaches its outwardly located dead center position at the end of the suction stroke, the working chamber is filled with fluid, and the flow of fluid must stop. Consequently, no fluid pressure acts on the valve head 2, while the force exerted by the pivoted control member 30 due to the centrifugal force prevails as before during rotation of the rotor. Mass 4 on control member 30 moves outwardly, and pulls the valve member into the valve case so that the valve head 2 directly abuts the valve seat 11 when the piston 50 arrives in the outer dead center position before the flow of fluid is reversed, and before piston 50 has started its inward discharge stroke. Of course, when the inward stroke of piston 50 takes place, the valve head remains tightly seated on valve seat 11.

During the inward movement of the piston, the fluid in the respective working chamber 35 is subjected to increased pressure, and as soon as the fluid pressure is higher than the pressure in the discharge passages 44, 45 the respective outlet valve member 15 is moved inwardly to the position illustrated in the upper portion of FIG. 5, and the outlet valve is opened. The end members 16, described with reference to FIGS. 3 and 4, limit this movement of the outlet valve member.

When valve head 13 is spaced from valve seat 17, fluid flows through the outlet opening formed by the valve seat 17, around valve head 13, through passage 14, openings 19, inner passage 18, and through the opening in the end member 20 into the respective outlet passage 44 or 45.

When the respective piston 50 arrives in its inner dead center position, the flow of fluid stops, and the centrifugal force acting on the outlet valve member 13, 15 is sufficient to move the outlet valve member outwardly to the valve closing position shown in the lower portion of FIG. 7. Consequently, the outlet valves are closed before the suction stroke has started whereby fluid losses are avoided. The fluid discharge from the outlet passages flows into and out of the duct formed by the outlet tube 47.

Two outlet tubes may be provided, or outlet tube 47 partitioned in such a manner that the fluid discharged from outlet passages 44, and the fluid discharge from outlet passages 45 flows in two separate axially extending discharge ducts.

It will be noted that the valve means illustrated in FIGS. 3 and 4 are properly operated by the centrifugal force if mounted in radial position, while the valve means illustrated in FIGS. 1 and 2 are properly operated by the centrifugal force if mounted in an axially extending position. If the construction and design of the rotor renders it more advantageous to mount the discharge valve means in a position extending parallel to the axis of rotation of the rotor, for example opposite the inlet valve means shown in FIG. 7, the discharge valve means described with reference to FIGS. 5 and 6 is used since in this embodiment the control member 30 is arranged in such a manner that the valve member moves in axial direction when a centrifugal force acts in radial direction on the control member 30. As previously noted, the valve cases may be an integral part of the rotor body, and the valve members may be directly mounted in corresponding guideways of the rotor and cooperate with valve seats formed in the same. In such a construction, passages must be provided between the outlet and inlet tubes, and cavities in the rotor corresponding to the recesses 10 and 32.

The use of axial type inlet valves as described with reference to FIGS. 1 and 2 in combination with radial type outlet valves as described with reference to FIGS. 3 and 4 results in a rotor of comparatively small outer diameter, and having only short and almost straight inlet and outlet passages which can be easily made in the rotor body.

In accordance with an important feature of the invention, the boundaries of the working chamber are partly formed by those parts in which the valve seats are provided, so that the valve seats define inlet and outlet openings in the surfaces bounding the working chambers 35. Correspondingly, the stems and the guideways in which the stems are guided are located outside of the working chambers and by this arrangement, fluid losses are reduced, while the dead spaces in the working chambers at the end of the compression stroke are reduced to a minimum. Due to this feature, a very high volumetric efficiency of hydraulic apparatus is obtained which is particularly significant in liquid operated machines, but also of importance in gas compressors, air motors, and rotary combustion engines employing pistons or vanes.

The valve assemblies according to the invention reduce turbulence, accelerations, and losses due to inner friction in the fluid. Losses due to flow of fluid through the inlet valves during the compression stroke are prevented so that the necessary initial pressure is reduced. The valves can be constructed of very few and simple parts which have a long span of life. Since the valves are operated by the centrifugal force, and not by parts subject to fatigue after prolonged use, the valves are operated and actuated in exactly the same manner regardless of the time of use of the machine.

It will be understood that each of the elements and valve assemblies described above, or two or more together, may also find a useful application in other types of rotary hydraulic apparatus and fluid receiving and discharging machines, differing from the type described above.

While the invention has been illustrated and described as embodied in a centrifugal valve arrangement for rotary hydraulic apparatus including axially and radially movable valve members, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a rotary machine, in combination, rotor means rotatable about an axis and being formed with suction inlet passage means, discharge outlet passage means and with a cavity; means for forming in said cavity at least one working chamber alternately expanding and contracting during rotation of said rotor means and communicating with said passage means; an inlet valve means in said inlet passage means having a valve seat forming an inlet opening in said working chamber, and an inlet valve member guided outside of said chamber movable between a closing position abutting said seat and an open position spaced from said seat; and an outlet valve means in said outlet passage means having a valve seat forming a discharge opening in said working chamber, and an outlet valve member guided outside of said chamber movable between a closing position abutting said seat and an open position spaced from said seat, said valve members being constructed and arranged so that fluid flowing through said passage means holds said valve members in said open position, each of said valve means having masses responsive to the centrifugal force during rotation of said rotor means and movably disposed to urge the valve member thereof to said closing position directly when expansion and contraction, respectively, of said working chamber terminates and the flow of fluid through the correlated passage means stops.

2. In a rotary machine, in combination, rotor means rotatable about an axis and being formed with a plurality of cavities, a plurality of inlet passage means respectively connected with said cavities, and a plurality of outlet passage means respectively connected with said cavities; means for forming in each of said cavities a working chamber alternately expanding and contracting during rotation of said rotor means and communicating with said outlet and inlet passage means; an inlet valve means in each of said inlet passage means having a valve seat forming an inlet opening in the respective working chamber, and an inlet valve member guided in said rotor outside of said working chamber for movement between a closing position abutting said seat and an open position spaced from said seat; an outlet valve means in each of said outlet passage means and having a valve seat forming a discharge opening in the respective working chamber, and an outlet valve member guided in said rotor outside of said working chamber for movement between a closing position abutting said seat and an open position spaced from said seat, at least one of said valve means having a valve member guided for movement along a path parallel with said axis of said rotor means, said valve members being constructed and arranged so that fluid flowing through said passage means during expansion and contraction of said working chambers holds said valve members in said open position, each of said valve means having masses responsive to the centrifugal force during rotation of the rotor means and movably disposed to urge the valve member thereof to a closing position directly when expansion and contraction, respectively, of the respective working chamber terminates and the flow of fluid through the correlated passage means stops, means mounting the mass of said one valve means for movement in a radial direction of said rotor and transversely to said path, and means for connecting said last mentioned mass with said valve member of said one valve means so that said valve member is urged by the centrifugal force to move parallel to said axis.

3. In a rotary machine, in combination, rotor means rotatable about an axis and being formed with a plurality of cavities, with an inlet duct and an outlet duct extending along said axis, one of said ducts surrounding the other duct, a plurality of inlet passage means respectively connecting said inlet duct with said cavities, and a plurality of outlet passage means respectively connecting said outlet duct with said cavities, each cavity, and the associated inlet and outlet passage means being located in a radial plane passing through said axis; means for forming in each of said cavities a working chamber alternately expanding and contracting during rotation of said rotor means and communicating with said outlet and inlet passage means; an inlet valve means in each of said inlet passage means having a valve seat forming an inlet opening in the respective working chamber, and an inlet valve member guided in said rotor outside of said working chamber for movement between a closing position abutting said seat and an open position spaced from said seat; an outlet valve means in each of said outlet passage means and having a valve seat forming a discharge opening in the respective working chamber, and an outlet valve member guided in said rotor outside of said working chamber for movement between a closing position abutting said seat and an open position spaced from said seat, at least one of said valve means having a valve member guided for movement along a path parallel with said axis of said rotor means, said valve members being constructed and arranged so that fluid flowing through said passage means during expansion and contraction of said working chambers holds said valve members in said open position, each of said valve means having masses responsive to the centrifugal force during rotation of the rotor means and movably disposed to urge the valve member thereof to a closing position directly when expansion and contraction, respectively, of the respective working chamber terminates and the flow of fluid through the correlated passage means stops, means mounting the mass of said one valve means for movement in a radial direction of said rotor and transversely to said path, and means for connecting said last mentioned mass with said valve member of said one valve means so that said valve member is urged by the centrifugal force to move parallel to said axis.

4. In a rotary machine, in combination, rotor means rotatable about an axis and being formed with a plurality of cavities, with an inlet duct and an outlet duct extending along said axis, one of said ducts surrounding the other duct, a plurality of inlet passage means respectively connecting said inlet duct with said cavities, and a plurality of outlet passage means respectively connecting said outlet duct with said cavities, each cavity, and the associated inlet and outlet passage means being located in a radial plane passing through said axis, said outlet and inlet passage means having substantially straight portions extending at an angle to said axis and said ducts; means for forming in each of said cavities a working chamber alternately expanding and contracting during rotation of said rotor means and communicating with said outlet and inlet passage means; an inlet valve means in each of said inlet passage means having a valve seat forming an inlet opening in the respective working chamber, and an inlet valve member guided in said rotor outside of said working chamber for movement between a closing position abutting said seat and an open position spaced from said seat; an outlet valve means in each of said outlet passage means and having a valve seat forming a discharge opening in the respective working chamber, and an outlet valve member guided in said rotor outside of said working chamber for movement between a closing position abutting said seat and an open position spaced from said seat, at least one of said valve means having a valve member guided for movement along a path parallel with said axis of said rotor means, said valve members being constructed and arranged so that fluid flowing through said passage means during expansion and contraction of said working chambers holds said valve members in said open position, each of said valve means having masses responsive to the centrifugal force during rotation of the rotor means and movably disposed to urge the valve member thereof to a closing position directly when expansion and contraction, respectively, of the respective working chamber terminates and the flow of fluid through the correlated passage means stops, means mounting the mass of said one valve means for movement in a radial direction of said rotor and transversely to said path, and means for connecting said last mentioned mass with said valve member of said one valve means so that said valve member is urged by the centrifugal force to move parallel to said axis.

5. A rotary machine as set forth in claim 3 wherein said rotor includes an axially extending outlet tube forming said outlet duct, and an axially extending inlet tube surrounding said outlet tube and defining with the same said inlet duct; wherein said outlet duct is longer than said inlet duct and is connected at the inner end thereof with said outlet passage means; and wherein said inlet duct is connected at the inner end thereof with said inlet passage means.

6. In a rotary machine, in combination, rotor means rotatable about an axis and being formed with suction inlet passage means having a passage portion extending parallel to said axis, and discharge outlet passage means having a passage portion extending in radial direction, said rotor means having a cavity connected with said passage portions; means for forming in said cavity at least one working chamber alternately expanding and contracting during rotation of said rotor means and communicating with said passage means; an inlet valve means in said passage portion of said inlet passage means having a valve seat forming an inlet opening in said working chamber, and an inlet valve member guided outside of said chamber for movement between a closing position abutting said seat and an open position spaced from said seat; and an outlet valve means in said passage portion of said outlet passage means having a valve seat forming a discharge in said working chamber, and an outlet valve member guided outside of said chamber for movement between a closing position abutting said seat and an open position spaced from said seat, said valve members being constructed and arranged so that fluid flowing through said passage means holds said valve members in said open position, each of said valve means having masses responsive to the centrifugal force during rotation of said rotor means and movably disposed to urge the valve member thereof to said closing position directly when expansion and contraction, respectively, of said working chamber terminates and the flow of fluid through the correlated passage portions stops, at least one of said valve means including a control member turnably mounted on said valve means and having an arm engaging said valve member and another positioned for radial movement under the action of the centrifugal force and supporting said mass.

7. A machine as set forth in claim 6 wherein said outlet valve member has a valve head cooperating with said seat, and a hollow stem having openings so that fluid flows in said open position of said outlet valve member through said valve seat and said hollow stem into said outlet passage means.

8. A machine as set forth in claim 7 wherein said outlet valve means includes a valve case formed with said seat and with a guideway for guiding said valve stem along a straight path during movement of said valve member between said open and closing positions.

9. A machine as set forth in claim 6 wherein said inlet valve member has a valve head cooperating with said seat, and a hollow stem having openings so that fluid flows in said open position of said inlet valve member through said hollow stem and said seat into said working chamber.

10. A machine as set forth in claim 9 wherein said inlet valve means includes a valve case formed with said seat and with a guideway for guiding said valve stem along a straight path during movement of said valve member between said open and closing positions.

11. A machine as set forth in claim 10 wherein said inlet valve means includes said control member turnably mounted on said valve case of said inlet valve means and having a bifurcated arm embracing said stem and engaging opposite sides thereof and another arm positioned for radial movement under the action of the centrifugal force and supporting said mass so that said bifurcated arm moves said inlet valve member to said closing position when expansion of said working chamber terminates.

12. A machine as set forth in claim 11 wherein said inlet valve means includes a pin turnably mounting said control member on said valve case.

13. In a rotary machine, in combination, a rotor rotatable about an axis; and a valve mounted in said rotor so as to be operated by the centrifugal force and including a valve case formed with a straight guideway, with a valve seat aligned with said guideway and forming a valve opening, and with a recess at the end of the guideway remote from said valve seat; a valve member having a stem guided in said guideway and a valve head cooperating with said valve seat, said stem being formed with a passage extending axially therethrough and having lateral openings for communication with said valve opening; and a control member mounted in said recess for turning movement and having one arm having a greater mass so as to be displaced by centrifugal force developed during rotation of said valve means about an axis spaced therefrom, and another bifurcated arm having two fingers located on opposite sides of said valve stem and having portions engaging the same for urging said valve member to a position in which said valve head abuts said valve seat when said one arm is displaced by the centrifugal force.

14. A machine as set forth in claim 13 wherein the end of said stem remote from said valve head is closed, and wherein said two fingers of said bifurcated arms engage the inside of said closed end under the action of centrifugal force.

15. A machine as set forth in claim 13 wherein said stem is tubular and has an open end remote from said valve head, and wherein said fingers of said bifurcated arm abut said open end of said tubular stem under the action of centrifugal force.

16. In a rotary machine, in combination, a rotor rotatable about an axis; and a valve mounted in said rotor so as to be operated by the centrifugal force and including a valve case formed with a straight guideway extending therethrough, with a valve seat aligned with said guideway and a cavity intermediate said guideway and said seat; a valve member having the stem guided in said guideway and a valve head cooperating with said seat, said stem being formed with an axial passage and with lateral openings communicating with said cavity; and an end member abutting said valve case at the end thereof remote from said valve seat and having a passage communicating with said guideway and with said axial passage of said valve member, said valve member being movable between closing position in which said head abuts said seat, and an open position in which the end of said stem remote from said head abuts said end member and being disposed inwardly of said valve seat in radial direction so that centrifugal force acting on said valve member urges said head against said seat.

17. In a rotary fluid handling machine, in combination, rotor means rotatable about an axis and being formed with passage means for a fluid; means operative during rotation of said rotor means to cause an intermittent flow of fluid in one flow direction through said passage means; valve means in said passage means having a channel including a valve seat, and a valve member having a free channel communicating with said channel, and a head portion, and being movable in a direction transverse to said axis between a closing position in which said head portion abuts said valve seat and an open position, said head portion being disposed downstream of said valve seat in said flow direction inwardly of said valve seat in radial direction and moved to said open position by fluid flowing through said passage means and said channels, said valve member including a mass spaced from said axis of rotation, surrounding said free channel and being constructed and arranged to move to said closing position when said mass moves outwardly under the action of the centrifugal force directly upon each interruption of said intermittent flow in said passage means and said channels.

18. In a rotary fluid handling machine, in combination, rotor means rotatable about an axis and being formed with passage means for a fluid; means operative during rotation of said rotor means to cause an intermittent flow of fluid in one flow direction through said passage means; valve means in said passage means having a channel including a valve seat, and a valve member having a free channel communicating with said channel, and a head portion, and being movable in a direction substantially parallel to said axis between a closing position in which said head portion abuts said valve seat and an open position, said head portion being disposed downstream of said valve seat in said flow direction and moved to said open position by fluid flowing through said passage means and said channels, said valve means including a mass spaced from said axis of rotation connected with said valve member for movement therewith, said mass being mounted for movement away from said axis outside of said channels and being constructed and arranged to move said valve member to said closing position when said mass moves outwardly under the action of the centrifugal force directly upon each interruption of said intermittent flow in said passage means and said channels.

19. In a rotary fluid handling machine, in combination, rotor means rotatable about an axis and being formed with passage means for a fluid; means operative during rotation of said rotor means to cause an intermittent flow of fluid in one flow direction through said passage means; valve means in said passage means having a channel including a valve seat, and a valve member having a free channel communicating with said channel, and a head portion, and being movable between a closing position in which said head portion abuts said valve seat and an open position, said head portion being disposed downstream of said valve seat in said flow direction and moved to said open position by fluid flowing through said passage means and said channels, said valve means including a mass located outside of said channels spaced from said axis of rotation connected with said valve member for movement therewith, and being constructed and arranged to move said valve member to said closing position when said mass moves outwardly under the action of the centrifugal force directly upon each interruption of said intermittent flow in said passage means and said channels.

References Cited by the Examiner

UNITED STATES PATENTS

| | | | |
|---|---|---|---|
| 941,646 | 11/1909 | Olsen et al. | |
| 2,619,978 | 12/1952 | Grandgirard | 137—53 |
| 2,674,229 | 4/1954 | Karlen | 137—56 X |
| 2,748,788 | 6/1956 | Duckstein | 137—53 |
| 2,789,515 | 4/1957 | Smith | 103—161 |
| 3,087,437 | 4/1963 | Henrichsen | 103—161 |
| 3,090,394 | 5/1963 | Page | 137—56 |
| 3,099,223 | 7/1963 | Mercier | 103—161 |

FOREIGN PATENTS 525,291   5/1955   Italy.

SAMUEL LEVINE, *Primary Examiner.*

LAURENCE V. EFNER, *Examiner.*

M. PETRY, J. C. MUNRO, *Assistant Examiners.*